(12) United States Patent
Doumen

(10) Patent No.: US 9,946,474 B2
(45) Date of Patent: Apr. 17, 2018

(54) STORING AND ACCESSING DATA

(71) Applicant: IRDETO B.V., Hoofddorp (NL)

(72) Inventor: Jeroen Doumen, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 0 days.

(21) Appl. No.: 14/430,906

(22) PCT Filed: Mar. 27, 2013

(86) PCT No.: PCT/EP2013/056512
§ 371 (c)(1),
(2) Date: Mar. 24, 2015

(87) PCT Pub. No.: WO2014/154261
PCT Pub. Date: Oct. 2, 2014

(65) Prior Publication Data
US 2016/0018996 A1  Jan. 21, 2016

(51) Int. Cl.
G06F 3/06      (2006.01)
G06F 11/10     (2006.01)
G06F 21/10     (2013.01)

(52) U.S. Cl.
CPC ............ G06F 3/0619 (2013.01); G06F 3/064 (2013.01); G06F 3/0622 (2013.01);
(Continued)

(58) Field of Classification Search
CPC .... G06F 21/10; G06F 3/0619; G06F 11/1076; G06F 3/064; G06F 3/0673; G06F 3/0622;
(Continued)

(56) References Cited

U.S. PATENT DOCUMENTS 6,564,322 B1 * 5/2003 Jameson ................. G06F 21/10
                                                    713/176
8,325,994 B2 * 12/2012 Davida ................... G06F 21/32
                                                    340/5.53
(Continued)

FOREIGN PATENT DOCUMENTS

CN      102890756 A     1/2013
EP      1376305 A2      1/2004
(Continued)

OTHER PUBLICATIONS

International Search Report and Written Opinion cited in corresponding International Application No. PCT/EP2013/056512 dated Jan. 9, 2014.

(Continued)

Primary Examiner — Saleh Najjar
Assistant Examiner — Shu Chun Gao
(74) Attorney, Agent, or Firm — Rimon, P.C.; Marc Kaufman

(57) ABSTRACT

A method of storing an amount of data D in association with a device, the method comprising: obtaining a characteristic C of the device; generating error correction data R for the characteristic C, the error correction data R enabling correction of up to a predetermined number of errors in a version of the characteristic C; combining the characteristic C with the amount of data D and an authentication key K to generate storage data P, wherein said combining is arranged so that the amount of data D and the authentication key K are obtainable using the characteristic C and the storage data P; generating a signature using a signature key, the signature being a digital signature of a quantity of data comprising the storage data P, the amount of data D and the authentication key K, wherein the signature key corresponds to a verification key accessible by the device; generating an authentication code for the error correction data R using the authen- (Continued)

tication key K, wherein the authenticity of the error correction data R is verifiable using the authentication code and the authentication key K; and storing the error correction data R, the storage data P, the signature and the authentication code to thereby store the amount of data D.

33 Claims, 10 Drawing Sheets

(52) U.S. Cl.
CPC ........ *G06F 3/0673* (2013.01); *G06F 11/1076* (2013.01); *G06F 21/10* (2013.01); *G06F 2221/0704* (2013.01)

(58) Field of Classification Search
CPC ........... G06F 2221/0704; H04L 9/0866; H04L 9/3247; H04L 9/3278; H04L 9/0869; H04L 9/30; H04L 2209/04; H04L 2209/24; H04L 2209/84; H04L 2209/34; H04L 2209/80

See application file for complete search history.

(56) References Cited

U.S. PATENT DOCUMENTS

| | | | |
|---|---|---|---|
| 2007/0138306 A1* | 6/2007 | Obrea | G07B 17/00508 235/494 |
| 2012/0321077 A1* | 12/2012 | Shiota | H04L 9/0866 380/44 |
| 2013/0318358 A1* | 11/2013 | Wang | G06F 21/31 713/182 |

FOREIGN PATENT DOCUMENTS

| | | |
|---|---|---|
| WO | 2007056054 A1 | 5/2007 |
| WO | 2012122674 A1 | 9/2012 |
| WO | 2014154261 A1 | 10/2014 |

OTHER PUBLICATIONS

Chinese office action received in connection with Chinese Application No. 201380053053.3, dated Nov. 9, 2017, 12 pages.

* cited by examiner

STORING AND ACCESSING DATA

The present application is the United States national stage of International Application No. PCT/EP2013/056512, filed Mar. 27, 2013, the entire content of which is incorporated herein by reference.

FIELD OF THE INVENTION

This invention relates to a method of storing an amount of data in association with a device and a method of controlling access to an amount of data at a device, and apparatus and computer programs for carrying out such methods.

BACKGROUND OF THE INVENTION

It is known to store data on a device in a manner that "locks" the stored data to the device, i.e. so that the stored data, if transferred to a second device, cannot be used on that second device. The data may, for example, comprise a cryptographic key for use by an application on the device to access (e.g. decrypt, or enable decryption of) content being stored on the device as encrypted content—in this way, even if the data and the encrypted content are distributed to other devices in an unauthorized manner, those other devices will not be able to access the content as those other devices will not be able to successfully (or correctly) use the data.

FIG. 1a of the accompanying drawings is a flowchart schematically illustrating a method 100 of storing and accessing an amount of data D in a manner that locks the amount of data D to a device. The device may be any kind of data processing device, such as a desktop computer, a mobile telephone, a laptop, a tablet computer, a set top box, a smart card, a games console, etc. The method 100 may be implemented in dedicated hardware, as software executing on a processor of the device, or as a combination of hardware and software.

At a step 102, the amount of data D is stored on the device for the first time, i.e. the device is initialized with the amount of data D. The amount of data D is not stored in clear form, but is stored in a protected form so that the amount of data D may not be determined directly by inspecting the contents of a memory or storage medium of the device. This step is sometimes referred to as an "enrolment" step.

For example, when initially installing an application (e.g. a computer program or other software) on a device, the installation process may create the amount of data D for subsequent use by the application and store that amount of data D at the step 102.

As mentioned, the amount of data D is stored in protected form. If this protected form is copied to another device, the intention is that that other device will not be able to determine, or access, the amount of data D from the copied protected form of the amount of data D.

An example of the processing performed at the step 102 shall be described shortly with reference to FIG. 1b of the accompanying drawings.

At a step 104, the device (or an application executing or running on the device) attempts to access the amount of data D using the protected form of the amount of data D. If the device that carries out the step 104 is the device to which the protected form of the amount of data D corresponds (i.e. it is the device to which the stored amount of data D is locked at the step 102), then at the step 104 the device should be able to access the amount of data D. If, on the other hand, the device that carries out the step 104 is not the device to which the protected form of the amount of data D corresponds (i.e. it is not the device to which the stored amount of data D is locked at the step 102), then at the step 104 the device should not be able to access the amount of data D.

An example of the processing performed at the step 104 shall be described shortly with reference to FIG. 1c of the accompanying drawings.

FIG. 1b is a flowchart schematically illustrating a method 130 for storing the amount of data D on a device, in a manner that locks the amount of data D to that device. The method 130 may be carried out, for example, to implement the step 102 of FIG. 1a, although it will be appreciated that other methods for implementing the step 102 of FIG. 1a could be used instead.

At a step 132, a characteristic C of the device is obtained (or determined or measured). The characteristic C is a value (or an identifier or code) that identifies the device, or that distinguishes the device from other devices. There are many known ways of obtaining a characteristic C of the device. For example, the characteristic C may be based on one or more of:

- A serial number of a storage medium (e.g. a magnetic disc, a memory chip, etc) of the device.
- A serial number of a processor of the device.
- A serial number of any other component of the device or of the device itself.
- Contents of memory during start-up of the device.
- One or more properties of a component of the device, such as a processing speed of a processor of the device, a storage capacity of a storage medium of the device, a number of USB ports of the device, a resolution of a screen of the device, etc.
- An identifier of one or more software applications installed on the device, or of one or more modules, elements, plug-ins, etc. of the one or more applications—for example, the version of a browser installed on the device and identities of modules (e.g. language packs, toolbars, etc.) that are installed for that browser.
- Any other information, aspect, property, feature or configuration of the device.

Such data about the device and its current configuration may be collected. As this data may be of variable size (depending on the nature of the device and how it is currently configured), a hash of the collected data may be generated, so as to obtain a predetermined fixed-length value from the collected data. The characteristic C may be set to be this hash value. However, it will be appreciated (and is known to the skilled person) that the characteristic C may be formed from the collected data in any other suitable way.

Error correction codes (ECCs) are well-known—examples of ECCs include Reed-Solomon codes, BCH codes, Turbo codes, etc. In particular, given an amount of data X, an ECC may be used to generate error correction data Y for the data X (or redundancy data, sometimes referred to as a checksum or a parity check). The ECC encoded version, or codeword, W for the data X may then be set to be W=X||Y (where herein, a||b represents the concatenation of data a with data b)—this form of ECC encoding is known as systematic ECC encoding. ECCs use a corresponding symbol alphabet (which is often a Galois field of size $2^s$ for some positive integer s)—the original data X, the error correction data Y and thus the codeword W are represented using symbols of that alphabet. The error correction data Y is based on the original data X and is arranged such that if one or more errors are introduced into the codeword W, so as to generate a modified value W* (i.e. a new version W* of the codeword W where one or more of the symbols representing W* differ from the symbols at corresponding locations in the codeword W), then those errors can be corrected so as to obtain the original codeword W from the value W*. The number of errors that can be introduced into the codeword W to generate the value W* whilst still being able to regenerate the original codeword W from the value W* is called the error-correction-capability, $\alpha$, of the ECC—this is a predetermined number for the ECC which may be set by setting appropriate parameters for the ECC. The errors may be corrected whether they are introduced into the data X within the codeword W=X||Y and/or into the error correction data Y within the codeword W=X||Y. However, in situations in which it is known that the errors will only occur in the original data X, then the error correction data Y may be viewed as data that enables correction of up to a predetermined number (the error-correction-capability, $\alpha$, of the ECC) of errors in a version X* of the data X (where W*=X*||Y).

As ECCs are well-known, further detail regarding ECCs, ECC encoding, ECC decoding, or other operations involving ECCs shall not be described herein.

At a step 134, error correction data R for the characteristic C is generated using an ECC. As discussed above, the error correction data R is data that enables correction of up to a predetermined number (the error-correction-capability $\alpha$ of the ECC) of errors in a version of the characteristic C—i.e. if a version C* of the characteristic C is generated, where the version C* has a number N (where $0 \le N \le \alpha$) of errors or differences relative to the characteristic C, then the characteristic C may be regenerated or obtained from the version C*.

As mentioned above, ECCs are very well-known. The ECC used at the step 134 may be selected from any known (or future) ECCs that provide error correction data Y for an amount of input data X (as set out above).

At a step 136, storage data P is generated by combining the characteristic C with the amount of data D. In FIG. 1*b*, this is shown as creating the storage data P by XORing the characteristic C with the amount of data D—i.e. P=C⊕D. In this example, it is being assumed that the data D and the characteristic C are of the same length (or size)—if the initial values for the characteristic C and the amount of data D are not the same length, then they can be made to be the same length by, for example: (i) if the characteristic C is longer than the amount of data D, truncating the characteristic C so that it is the same length as the amount of data D, or expanding the amount of data D by repeating bits of the amount of data D so that the expanded amount of data D is the same length as the characteristic C; or (ii) if the characteristic C is shorter than the amount of data D, expanding the characteristic C by padding the characteristic C with padding bits (which could, for example, be existing bits of the characteristic C, or bits generated by forming one or more hashes of the characteristic C, etc.).

It will be appreciated, however, that the storage data P may be formed from the characteristic C and the amount of data D using any other method. All that is required is that the amount of data D can be obtained from the storage data P if the value of the characteristic C is known. In particular, the storage data P may be formed as a function F of the amount of data D and the characteristic C, i.e. P=F(D,C), where the function F has a corresponding function G such that G(P, C)=G(F(D,C))=D. The function F may be viewed as an invertible function (where G=$F^{-1}$, i.e. the inverse of F) that is keyed, or seeded, by the characteristic C. The XOR given in the example above is, of course, just one example of such a function, and it will be appreciated that any other such function could be used instead. Preferably, though, the amount of data D is not obtainable from the storage data P without (knowledge of) the characteristic C.

At a step 138, a digital signature Sig of a quantity of data comprising (or that is a function of) the storage data P and the error correction data R is generated, for example, a digital signature Sig of just the pair {R,P}. For this, a signature key SK is used.

The signature Sig may be generated by using an asymmetric digital signature algorithm. In this case, the signature key SK is a private key that corresponds to a public verification key VK. The device may store the verification key VK for future use (as explained shortly with reference to FIG. 1*c*). The signature key SK may be a private key associated with the device—the device may store the signature key SK, or, alternatively, the signature key SK and the verification key VK may be generated by the device during the step 102, with the verification key VK being stored for subsequent use and the signature key SK being discarded after the step 138. In some embodiments, the step 138 is performed by the device, with the device knowing the signature key SK. In other embodiments, the device does not have access to the signature key SK and only has access to the corresponding verification key VK (e.g. the verification key is hardcoded into the device)—for example, the signature key SK may be a signature key used by, or associated with, a manufacturer of the device, in which case the manufacturer may generate the signature Sig when the manufacturer initially makes and initialises the device with the amount of data D.

Alternatively, the signature Sig may be generated by using a symmetric digital signature algorithm (e.g. the signature Sig may be a message authentication code). In this case, the signature key SK is a secret key of the device that is stored by the device—the signature key SK may be used as a verification key VK (i.e. VK=SK) in the future (as explained shortly with reference to FIG. 1*c*).

Digital signatures schemes/algorithms (both symmetric and asymmetric) are well-known and shall, therefore, not be described in more detail herein.

At a step 140, the device stores: the error correction data R, the storage data P and the generated signature Sig. This stored data represents the amount of data D and is the above-mentioned protected form of the amount of data D.

FIG. 1*c* is a flowchart schematically illustrating a method 150 for controlling access to the amount of data D at (or stored on) a device. The device is storing a protected form of the amount of data D, where this protected form of the amount of data D was generated using the method 130 of FIG. 1*b*. The method 150 may be carried out, for example, to implement the step 104 of FIG. 1*a*, although it will be appreciated that other methods for implementing the step 104 of FIG. 1*a* could be used instead.

At a step 152, the protected form of the data is retrieved (e.g. from the memory or storage of the device at which the protected form of the data is located). Thus, at the step 152, the error correction data R, the storage data P and the generated signature Sig are obtained or accessed.

At a step 154, the signature Sig is verified against (or for or in relation to) a quantity of data comprising the storage data P and the error correction data R. This quantity of data is formed in the same way in which the quantity of data that was signed at the step 138 of FIG. 1*b* to generate the signature Sig was formed—for example, the quantity of data may be just the pair {R,P}. The verification of the signature Sig uses a verification algorithm corresponding to the signature generation algorithm, and makes use of the verification key VK corresponding to the signature key SK that was used to generate the signature Sig. Such verification algorithms are well-known and shall not be described in detail herein.

If, at a step 156, it is determined that the verification at the step 154 has failed (i.e. the signature Sig does not correspond to the quantity of data comprising the storage data P and the error correction data R), then processing terminates at a step 158. If, on the other hand, it is determined at the step 156 that the verification at the step 154 has succeeded (i.e. the signature Sig corresponds to the quantity of data comprising the storage data P and the error correction data R), then processing continues at a step 160.

At the step 160, a current characteristic C* of the device is obtained (or determined or measured). This is performed in the same way in which the characteristic C of the device was obtained at the step 132 of FIG. 1b. There are four possible scenarios:

(S-a) The device carrying out the step 104 is the same as the device that carried out the step 102, and the configuration/state/etc. of the device has not changed since the protected form of the amount of data D was generated and stored: in this case, the current characteristic C* will be the same as the original characteristic C (obtained at the step 132 of FIG. 1b).

(S-b) The device carrying out the step 104 is the same as the device that carried out the step 102, and the configuration/state/etc. of the device has changed slightly (or by a sufficiently small amount) since the protected form of the amount of data D was generated and stored: in this case, the current characteristic C* may differ from the original characteristic C (obtained at the step 132 of FIG. 1b) by at most a symbols or places, where a is the error-correction-capability of the ECC that was used at the step 134 of FIG. 1b—this means that these errors can be corrected using the error correction data R, and that the original characteristic C may be obtained (or restored) from the current characteristic C*.

(S-c) The device carrying out the step 104 is the same as the device that carried out the step 102, and the configuration/state/etc. of the device has changed significantly (or by a sufficiently large amount) since the protected form of the amount of data D was generated and stored: in this case, the current characteristic C* may differ from the original characteristic C (obtained at the step 132 of FIG. 1b) by more than a symbols or places, where a is the error-correction-capability of the ECC that was used at the step 134 of FIG. 1b—this means that these errors cannot all be corrected using the error correction data R, so that the original characteristic C cannot then be obtained (or restored) from the current characteristic C*.

(S-d) The device carrying out the step 104 is different from the device that carried out the step 102 (i.e. the protected form of the amount of data D has been transferred or copied to a different device): in this case, the current characteristic C* will almost certainly differ from the original characteristic C (obtained at the step 132 of FIG. 1b) by more than a symbols or places, where a is the error-correction-capability of the ECC that was used at the step 134 of FIG. 1b—this means that these errors cannot all be corrected using the error correction data R, so that the original characteristic C cannot then be obtained (or restored) from the current characteristic C*.

At a step 162, an error-correction decoding operation is performed on the current characteristic C* using the error correction data R to (try to) correct any errors that may exist in the current characteristic C* relative to the original characteristic C. The result of this error-correction decoding operation is a value C'. As discussed above, in scenarios (S-a) and (S-b) above, the original characteristic C is obtained from this error-correction decoding operation (i.e. C'=C); whereas in scenarios (S-c) and (S-d) above, the original characteristic C will almost certainly not be obtained from this error-correction decoding operation (i.e. C'≠C).

At a step 164, an amount of data D' is obtained or generated from the characteristic C' and the storage data P. In particular D'=G(P,C')—i.e. the step 164 obtains the amount of data D' from the characteristic C' and the storage data P using the inverse of the method (or function F) by which the storage data P was generated from the amount of data D and the characteristic C. In scenarios (S-a) and (S-b) above, C'=C, in which case D'=D, i.e. the step 164 generates the original amount of data D; whereas in scenarios (S-c) and (S-d) above, C'≠C, in which case D'≠D, i.e. the step 164 generates an amount of data D' different from the original amount of data D.

At a step 166, the generated amount of data D' is output or provided. Thus, if the step 104 of FIG. 1a is being performed on the same device as the device that performed the step 104 of FIG. 1a, and if the configuration of this device has not changed significantly, then the device can access the originally stored amount of data D; otherwise, the amount of data D will not be accessed at the step 104 of FIG. 1a.

In this way, the amount of data D may be stored on the device in a manner that "locks" the stored amount of data D to the device.

The problem scenario is, of course, scenario (S-c) set out above—in this scenario, the device that is trying to access the amount of data D is the correct physical device (i.e. the same device that originally stored the amount of data D in a protected form and to which the stored amount of data D is locked), however this device has been changed (e.g. by the addition, removal, or replacement of hardware, applications, software components, plug-ins, etc.) to such an extent that the current characteristic C* of this device is too different from the original characteristic C of this device, i.e. the number of differences between C and C* exceeds the error-correction-capability α of the ECC. Thus, a user of the device may: start in scenario (S-a) and thereby have access to the amount of data D; move to scenario (S-b) at some later point, e.g. due to some minor changes that the user makes to the device and still have access to the amount of data D; and then move to scenario (S-c) at some later point, again due to some further minor changes that the user makes to the device, at which point the device will not be able to access the amount of data D. This will occur despite the fact that the change to the device that moves the device from being in scenario (S-b) to being in scenario (S-c) may be very minor—as far as the user of the device is concerned, he has just made a very minor modification to his device (which may be completely unrelated to the use or purpose of the amount of data D), and now he is no longer able to carry out the functionality that would make use of the amount of data D (e.g. decrypting encrypted content).

SUMMARY OF THE INVENTION

Embodiments of the invention aim to address the above-mentioned problem with the stored protected form of the amount of data D becoming old (or "stale" or "out of data"), i.e. to enable successive modifications to the device whilst avoiding the device entering scenario (S-c) above.

According to a first aspect of the invention, there is provided a method of storing an amount of data D in association with a device, the method comprising: obtaining a characteristic C of the device; generating error correction data R for the characteristic C, the error correction data R enabling correction of up to a predetermined number of errors in a version of the characteristic C; combining the characteristic C with the amount of data D and an authentication key K to generate storage data P, wherein said combining is arranged so that the amount of data D and the authentication key K are obtainable using the characteristic C and the storage data P; generating a signature using a signature key, the signature being a digital signature of a quantity of data comprising the storage data P, the amount of data D and the authentication key K, wherein the signature key corresponds to a verification key accessible by the device; generating an authentication code for the error correction data R using the authentication key K, wherein the authenticity of the error correction data R is verifiable using the authentication code and the authentication key K; and storing the error correction data R, the storage data P, the signature and the authentication code to thereby store the amount of data D.

In some embodiments, the amount of data D is not obtainable from the storage data P without the characteristic C.

In some embodiments, the storage data P comprises an XOR of the characteristic C with a combination of the amount of data D and the authentication key K. The combination of the amount of data D and the authentication key K may comprise a concatenation of the amount of data D and the authentication key K.

In some embodiments, the signature is generated using an asymmetric digital signature algorithm.

In some embodiments, the authentication code is a message authentication code.

According to a second aspect of the invention, there is provided a method of controlling access to an amount of data D at a device, the device storing information comprising: error correction data R, storage data P, a signature and an authentication code, the information generated using a method according to the first aspect of the invention, the method comprising: determining a characteristic C of the device, wherein determining the characteristic C of the device comprises obtaining a current characteristic C* of the device and performing an error correction decoding operation on the current characteristic C* using the error correction data R; obtaining the amount of data D and an authentication key K using the determined characteristic C and the storage data P; determining, using a verification key, whether the signature corresponds to a quantity of data comprising: the storage data P, the amount of data D and the authentication key K; determining, using the authentication key K, whether the authentication code corresponds to the error correction data R; providing access to the amount of data D if both (a) the signature corresponds to the quantity of data and (b) the authentication code corresponds to the error correction data R; and denying access to the amount of data D if (a) the signature does not correspond to the quantity of data or (b) the authentication code does not correspond to the error correction data R.

In some embodiments, the amount of data D and the authentication key K are obtained together from an XOR of the storage data P and the determined characteristic C.

In some embodiments, the method comprises: if access to the amount of data D is provided, performing an update for the stored information based on the current characteristic C. In some embodiments, the method comprises: if access to the amount of data D is provided: determining whether to perform an update for the stored information; and if it determined that an update for the stored information is to be performed, then performing an update for the stored information based on the current characteristic C*. Determining whether to perform an update for the stored information may be based on one or more of: an amount of time elapsed since the information was last updated or initially stored; a number of accesses to the amount of data D that have been provided since the information was last updated or initially stored; a number of errors in the current characteristic C*.

In some embodiments, performing the update for the stored information comprises: generating new error correction data R* for the current characteristic C*, the new error correction data R* enabling correction of up to a predetermined number of errors in a version of the current characteristic C*; generating a new authentication code for the new error correction data R* using the authentication key K, wherein the authenticity of the new error correction data R* is verifiable using the new authentication code and the authentication key K; supplementing the error correction data R with the new error correction data R*; and storing the new authentication code.

In some embodiments, performing the update for the stored information comprises: generating new error correction data R* for the current characteristic C*, the new error correction data R* enabling correction of up to a predetermined number of errors in a version of the current characteristic C*; generating a new authentication code for the new error correction data R* using the authentication key K, wherein the authenticity of the new error correction data R* is verifiable using the new authentication code and the authentication key K; combining the current characteristic C* with the amount of data D and the authentication key K to generate new storage data P*, wherein said combining is arranged so that the amount of data D and the authentication key K are obtainable using the current characteristic C* and the new storage data P*; generating a signature using the signature key, the signature being a digital signature of a quantity of data comprising the new storage data P*, the amount of data D and the authentication key K; storing the new error correction data R* in place of the stored error correction data R; storing the new storage data P* in place of the stored storage data P; storing the new signature Sig* in place of the stored signature Sig; and storing the new authentication code in place of the stored authentication code.

According to a third aspect of the invention, there is provided a method of storing an amount of data D in association with a device, the method comprising: obtaining a characteristic C of the device; generating error correction data R for the characteristic C, the error correction data R enabling correction of up to a predetermined number of errors in a version of the characteristic C; combining the characteristic C with the amount of data D and an authentication key K to generate storage data P, wherein said combining is arranged so that the amount of data D and the authentication key K are obtainable using the characteristic C and the storage data P; generating a signature using a signature key, the signature being a digital signature of a quantity of data comprising the amount of data D and the authentication key K, wherein the signature key corresponds to a verification key accessible by the device; generating an authentication code for a quantity of data comprising the error correction data R and the storage data P, the authentication code generated using the authentication key K, wherein the authenticity of the error correction data R and the storage data P is verifiable using the authentication code and the authentication key K; and storing the error correction data R, the storage data P, the signature and the authentication code to thereby store the amount of data D.

In some embodiments, the amount of data D is not obtainable from the storage data P without the characteristic C.

In some embodiments, the storage data P comprises an XOR of the characteristic C with a combination of the amount of data D and the authentication key K. The combination of the amount of data D and the authentication key K may comprise a concatenation of the amount of data D and the authentication key K.

In some embodiments, the signature is generated using an asymmetric digital signature algorithm.

In some embodiments, the authentication code is a message authentication code.

According to a fourth aspect of the invention, there is provided a method of controlling access to an amount of data D at a device, the device storing information comprising: error correction data R, storage data P, a signature and an authentication code, the information generated using a method according to the third aspect of the invention, the method comprising: determining a characteristic C of the device, wherein determining the characteristic C of the device comprises obtaining a current characteristic C* of the device and performing an error correction decoding operation on the current characteristic C* using the error correction data R; obtaining the amount of data D and an authentication key K using the determined characteristic C and the storage data P; determining, using a verification key, whether the signature corresponds to a first quantity of data comprising the amount of data D and the authentication key K; determining, using the authentication key K, whether the authentication code corresponds to a second quantity of data comprising the error correction data R and the storage data P; providing access to the amount of data D if both (a) the signature corresponds to the first quantity of data and (b) the authentication code corresponds to the second quantity of data; and denying access to the amount of data D if (a) the signature does not correspond to the first quantity of data or (b) the authentication code does not correspond to the second quantity of data.

In some embodiments, the amount of data D and the authentication key K are obtained together from an XOR of the storage data P and the determined characteristic C.

In some embodiments, the method comprises: if access to the amount of data D is provided, performing an update for the stored information based on the current characteristic C*.

In some embodiments, the method comprises: if access to the amount of data D is provided: determining whether to perform an update for the stored information; and if it determined that an update for the stored information is to be performed, then performing an update for the stored information based on the current characteristic C*. Determining whether to perform an update for the stored information may be based on one or more of: an amount of time elapsed since the information was last updated or initially stored; a number of accesses to the amount of data D that have been provided since the information was last updated or initially stored; a number of errors in the current characteristic C*.

In some embodiments, wherein performing the update for the stored information comprises: generating new error correction data R* for the current characteristic C*, the new error correction data R* enabling correction of up to a predetermined number of errors in a version of the current characteristic C*; combining the current characteristic C* with the amount of data D and the authentication key K to generate new storage data P*, wherein said combining is arranged so that the amount of data D and the authentication key K are obtainable using the current characteristic C* and the new storage data P*; generating a new authentication code for a quantity of data comprising the new error correction data R* and the new storage data P*, the new authentication code generated using the authentication key K, wherein the authenticity of the new error correction data R* and the new storage data P* is verifiable using the new authentication code and the authentication key K; storing the new error correction data R* in place of the stored error correction data R; storing the new storage data P* in place of the stored storage data P; and storing the new authentication code in place of the stored authentication code.

In some embodiments of any of the first, second, third and fourth aspects of the invention, the amount of data D comprises a cryptographic key.

According to a fifth aspect of the invention, there is provided an apparatus arranged to carry out any one of the above methods.

According to a sixth aspect of the invention, there is provided a computer program which, when executed by a processor, causes the processor to carry out any one of the above methods. The computer program may be stored on a computer-readable medium.

BRIEF DESCRIPTION OF THE DRAWINGS

Embodiments of the invention will now be described, by way of example only, with reference to the accompanying drawings, in which:

FIG. 3b is a flowchart schematically illustrating a method, according to embodiments of the invention, for controlling access to an amount of data D at (or stored on) a device, the data having been stored using the method of FIG. 3a;

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

1—System Overview

Figure 2:
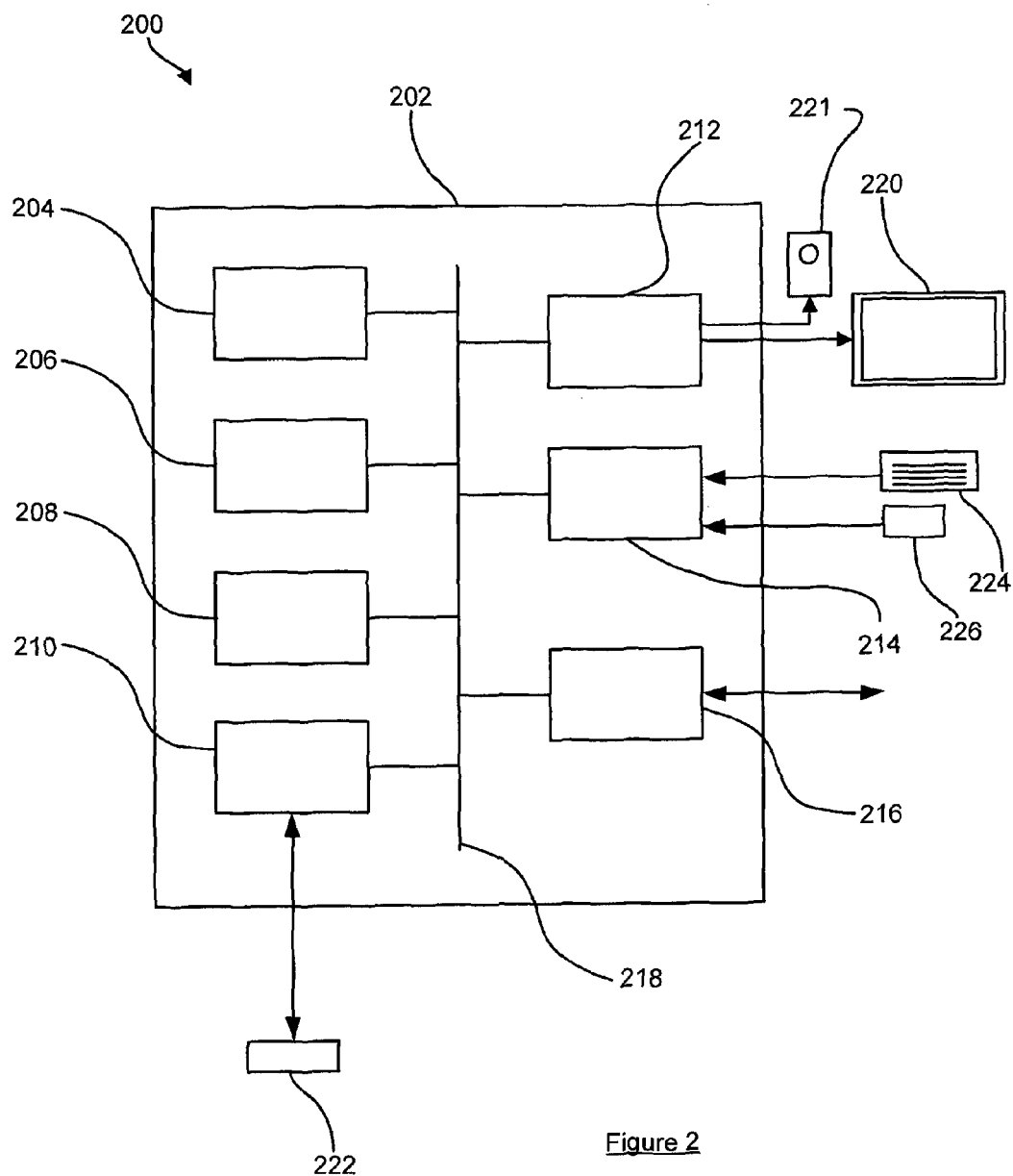
FIG. 2 schematically illustrates an example of a computer system.

FIG. 2 schematically illustrates an example of a computer system 200. The system 200 comprises a computer 202. The computer 202 comprises: a storage medium 204, a memory 206, a processor 208, an interface 210, a user output interface 212, a user input interface 214 and a network interface 216, which are all linked together over one or more communication buses 218.

The storage medium 204 may be any form of non-volatile data storage device such as one or more of a hard disk drive, a magnetic disc, an optical disc, a ROM, etc. The storage medium 204 may store an operating system for the processor 208 to execute in order for the computer 202 to function. The storage medium 204 may also store one or more computer programs (or software or instructions or code).

The memory 206 may be any random access memory (storage unit or volatile storage medium) suitable for storing data and/or computer programs (or software or instructions or code).

The processor 208 may be any data processing unit suitable for executing one or more computer programs (such as those stored on the storage medium 204 and/or in the memory 206), some of which may be computer programs according to embodiments of the invention or computer programs that, when executed by the processor 208, cause the processor 208 to carry out a method according to an embodiment of the invention and configure the system 200 to be a system according to an embodiment of the invention. The processor 208 may comprise a single data processing unit or multiple data processing units operating in parallel or in cooperation with each other. The processor 208, in carrying out data processing operations for embodiments of the invention, may store data to and/or read data from the storage medium 204 and/or the memory 206.

The interface 210 may be any unit for providing an interface to a device 222 external to, or removable from, the computer 202. The device 222 may be a data storage device, for example, one or more of an optical disc, a magnetic disc, a solid-state-storage device, etc. The device 222 may have processing capabilities—for example, the device may be a smart card. The interface 210 may therefore access data from, or provide data to, or interface with, the device 222 in accordance with one or more commands that it receives from the processor 208.

The user input interface 214 is arranged to receive input from a user, or operator, of the system 200. The user may provide this input via one or more input devices of the system 200, such as a mouse (or other pointing device) 226 and/or a keyboard 224, that are connected to, or in communication with, the user input interface 214. However, it will be appreciated that the user may provide input to the computer 202 via one or more additional or alternative input devices (such as a touch screen). The computer 202 may store the input received from the input devices via the user input interface 214 in the memory 206 for the processor 208 to subsequently access and process, or may pass it straight to the processor 208, so that the processor 208 can respond to the user input accordingly.

The user output interface 212 is arranged to provide a graphical/visual and/or audio output to a user, or operator, of the system 200. As such, the processor 208 may be arranged to instruct the user output interface 212 to form an image/video signal representing a desired graphical output, and to provide this signal to a monitor (or screen or display unit) 220 of the system 200 that is connected to the user output interface 212. Additionally or alternatively, the processor 208 may be arranged to instruct the user output interface 212 to form an audio signal representing a desired audio output, and to provide this signal to one or more speakers 221 of the system 200 that is connected to the user output interface 212.

Finally, the network interface 216 provides functionality for the computer 202 to download data from and/or upload data to one or more data communication networks.

It will be appreciated that the architecture of the system 200 illustrated in FIG. 2 and described above is merely exemplary and that other computer systems 200 with different architectures (for example with fewer components than shown in FIG. 2 or with additional and/or alternative components than shown in FIG. 2) may be used in embodiments of the invention. As examples, the computer system 200 could comprise one or more of: a personal computer; a server computer; a mobile telephone; a tablet; a laptop; a television set; a set top box; a games console; other mobile devices or consumer electronics devices; etc.

In the following descriptions of methods according to embodiments of the invention (as described with reference to FIGS. 3a, 3b and 3c), those methods are described as being carried out by a respective device/system—this device/system may be any one of the example systems discussed above.

3—Storing an Amount of Data D

Figure 1A:
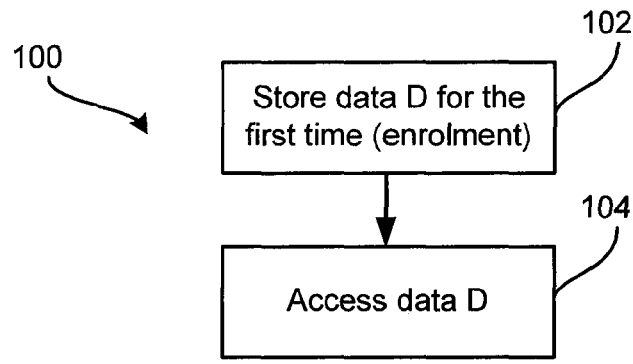
FIG. 1a is a flowchart schematically illustrating a method of storing and accessing an amount of data D in a manner that locks the amount of data D to a device.
Figure 3A:
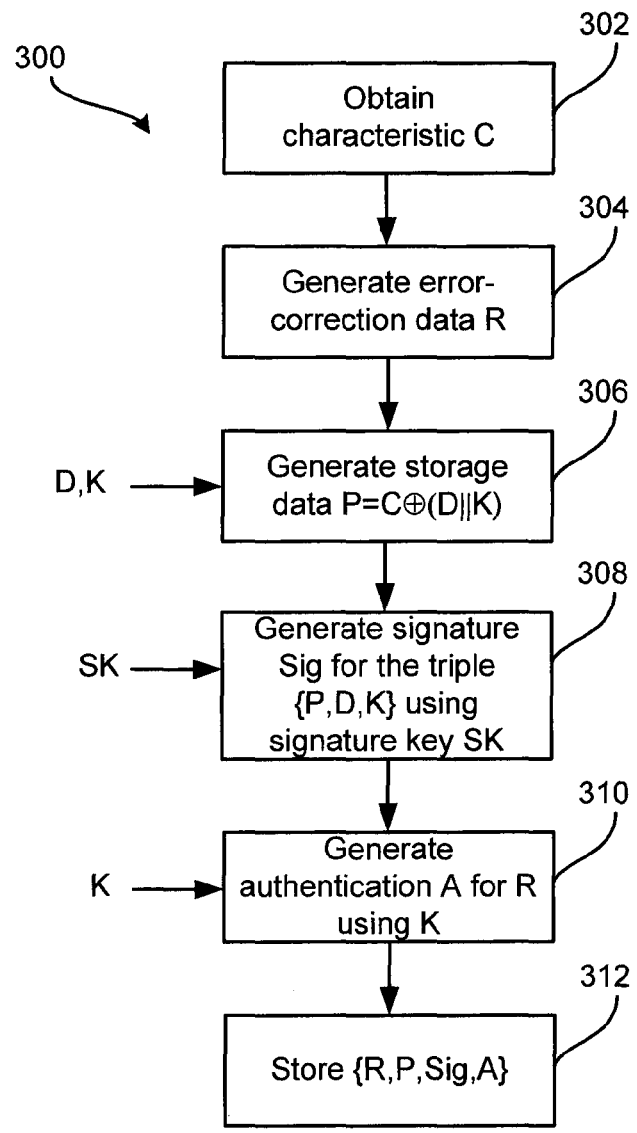
FIG. 3a is a flowchart schematically illustrating a method, according to embodiments of the invention, for storing an amount of data D on a device, in a manner that locks the amount of data D to that device.

FIG. 3a is a flowchart schematically illustrating a method 300, according to embodiments of the invention, for storing an amount of data D on a device, in a manner that locks the amount of data D to that device. The method 300 may be carried out, for example, to implement the step 102 of FIG. 1a. The method 300 may be carried out by the device itself (i.e. the device that is to store the amount of data D and to which the amount of data D is to be locked). The method 300 may, alternatively, be carried out by a different entity, such as a manufacturer of the device, with the method 300 being performed when the manufacturer initialises the device and wishes to store the amount of data D on the device in a manner that locks the amount of data D to the device (e.g. initialising the device with a personalised cryptographic key).

The amount of data D may be any data that needs to be stored. In some embodiments of the invention, the amount of data D comprises a cryptographic key, such as a cryptographic key particular to, or associated with, the device.

Figure 1B:
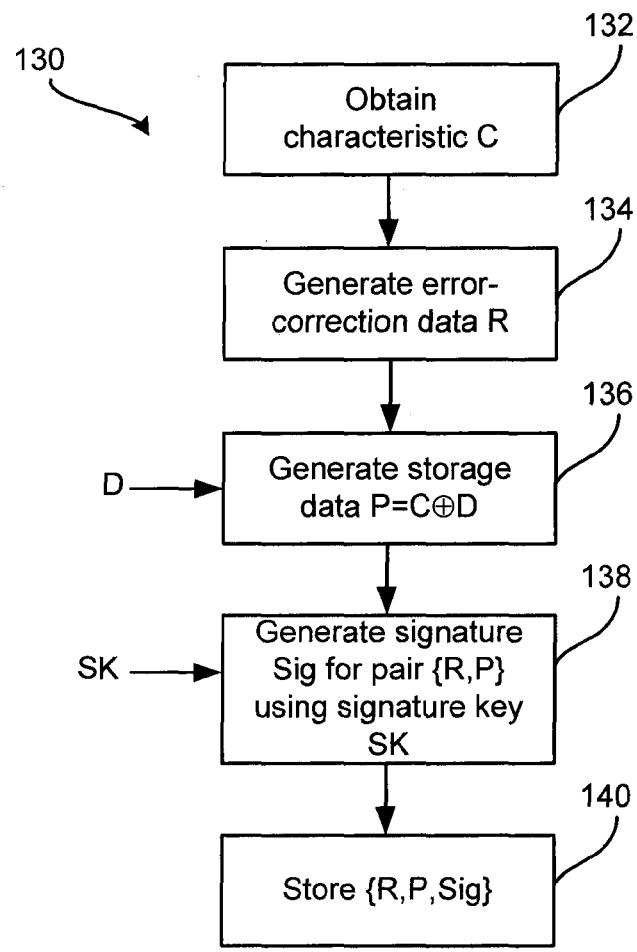
FIG. 1b is a flowchart schematically illustrating a method for storing the amount of data D on a device, in a manner that locks the amount of data D to that device.
Figure 1C:
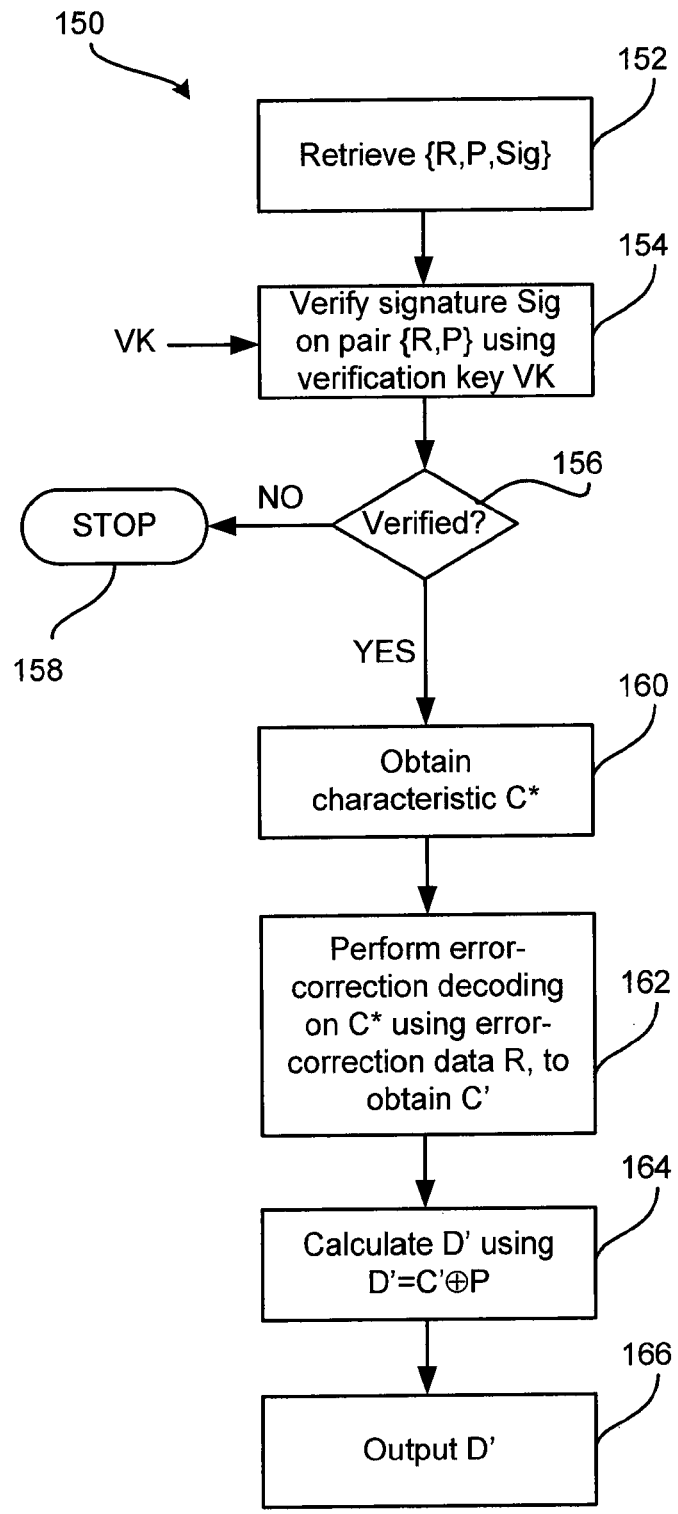
FIG. 1c is a flowchart schematically illustrating a method for controlling access to the amount of data D at (or stored on) a device, the data having been stored using the method of FIG. 1b.

At a step 302, a characteristic C of the device is obtained (or determined or measured). The step 302 may be carried out in the same way as at the step 132 of FIG. 1b.

At a step 304, error correction data R of the device is generated (or obtained or calculated) for the characteristic C. The error correction data R enables correction of up to a predetermined number of errors in a version of the characteristic C (this predetermined number being the error-correction-capability $\alpha$ of the ECC). The step 304 may be carried out in the same way as at the step 134 of FIG. 1b. The ECC used at the step 304 may be selected from any known (or future) ECGs that provide error correction data Y for an amount of input data X (as set out above).

At a step 306, storage data P is generated by combining the characteristic C with the amount of data D and an authentication key K. In FIG. 3a, this is shown as creating the storage data P by XORing the characteristic C with the concatenation (D∥K) of the amount of data D and the authentication key K—i.e. P=C⊕(D∥K). In this example, it is being assumed that (D∥K) and the characteristic C are of the same length (or size)—if the initial values for the characteristic C and (D∥K) are not the same length, then they can be made to be the same length by, for example: (i) if the characteristic C is longer than (D∥K), truncating the characteristic C so that it is the same length as (D∥K), or expanding (D∥K) by repeating bits of (D∥K) so that the expanded version of (D∥K) is the same length as the characteristic C; or (ii) if the characteristic C is shorter than (D∥K), expanding the characteristic C by padding the characteristic C with padding bits (which could, for example, be existing bits of the characteristic C, or bits generated by forming one or more hashes of the characteristic C, etc.).

It will be appreciated, however, that the storage data P may be formed from the characteristic C, the amount of data D and the authentication key K using any other method. All that is required is that the amount of data D and the authentication key K can be obtained from the storage data P if the value of the characteristic C is known. In particular, the storage data P may be formed as a function F of (a) the pair comprising the amount of data D and the authentication key K and (b) the characteristic C, i.e. P=F({D,K},C), where the function F has a corresponding function G such that G(P,C)=G(F({D,K},C))={P,K}. The function F may be viewed as an invertible function (where G=F$^{-1}$, i.e. the inverse of F) that is keyed, or seeded, by the characteristic C. The XOR given in the example above is, of course, just one example of such a function, and it will be appreciated that any other such function could be used instead. Preferably, though, the amount of data D is not obtainable from the storage data P without (knowledge of) the characteristic C.

The authentication key K is a cryptographic key for use in generating an authentication code for the error correction data R (as discussed in more detail below). The authentication key K may be generated as part of the step 306 (e.g. as a random or pseudo-random number, or as a value derived from the amount of data D); alternatively, the authentication key K may be a pre-existing value stored by, and associated with, the device.

At a step 308, a digital signature Sig of a quantity of data comprising (or that is a function of) the storage data P, the amount of data D and the authentication key K is generated, for example, a digital signature Sig of just the triple {P,D,K} (e.g. of a concatenation P∥D∥K). For this, a signature key SK is used. This quantity of data may be, for example, a concatenation of, interleaving of, or other combination or function (such as a hash) of the storage data P, the amount of data D and the authentication key K. The quantity of data may comprise other data in addition to the storage data P, the amount of data D and the authentication key K.

The signature Sig may be generated by using an asymmetric digital signature algorithm. In this case, the signature key SK is a private key that corresponds to a public verification key VK. The device may store the verification key VK for future use (as explained shortly with reference to FIG. 3b). The signature key SK may be a private key associated with the device—the device may store the signature key SK, or, alternatively, the signature key SK and the verification key VK may be generated by the device during the step 102, with the verification key VK being stored for subsequent use and the signature key SK being discarded after the step 308. In some embodiments, the step 308 is performed by the device, with the device knowing the signature key SK. In other embodiments, the device does not have access to the signature key SK and only has access to the corresponding verification key VK (e.g. the verification key is hardcoded into the device)—for example, the signature key SK may be a signature key used by, or associated with, a manufacturer of the device, in which case the manufacturer may generate the signature Sig when the manufacturer initial makes and initialises the device with the amount of data D.

Alternatively, the signature Sig may be generated by using a symmetric digital signature algorithm (e.g. the signature Sig may be a message authentication code). In this case, the signature key SK is a secret key of the device that is stored by the device—the signature key SK may be used as a verification key VK (i.e. VK=SK) in the future (as explained shortly with reference to FIG. 3b).

Digital signatures schemes/algorithms (both symmetric and asymmetric) are well-known and shall, therefore, not be described in more detail herein.

At a step 310, an authentication code A for the error correction data R is generated using the authentication key K. The authentication code A may a code (or value or data) that enables the authenticity of the error correction data R to be verified (using the authentication code A and the authentication key K). Here, "authenticity of the error correction data R" may be taken to mean that the origin/provenance of the error correction data R can be verified (i.e. only a device having the authentication key K could have generated this value of the authentication code A for this value of the error correction data R) and/or may be taken to mean that the integrity of the error correction data R may be verified (i.e. that no modifications to the error correction data R have occurred since the authentication code A was generated). The authentication code A may, for example, be a digital signature of the error correction data R using a symmetric signature algorithm—for example, the authentication code A may be a message authentication code for the error correction data R.

As authentication codes (and methods for generating and verifying authentication codes) are well-known, they shall not be described in detail herein. Any suitable method for generating an authentication code using the authentication key K may be used.

At a step 312, the device stores: the error correction data R, the storage data P, the generated signature Sig and the authentication code A. This stored data represents the amount of data D and is the above-mentioned protected form of the amount of data D for embodiments of the invention.

4—Accessing an Amount of Data D

Figure 3B:
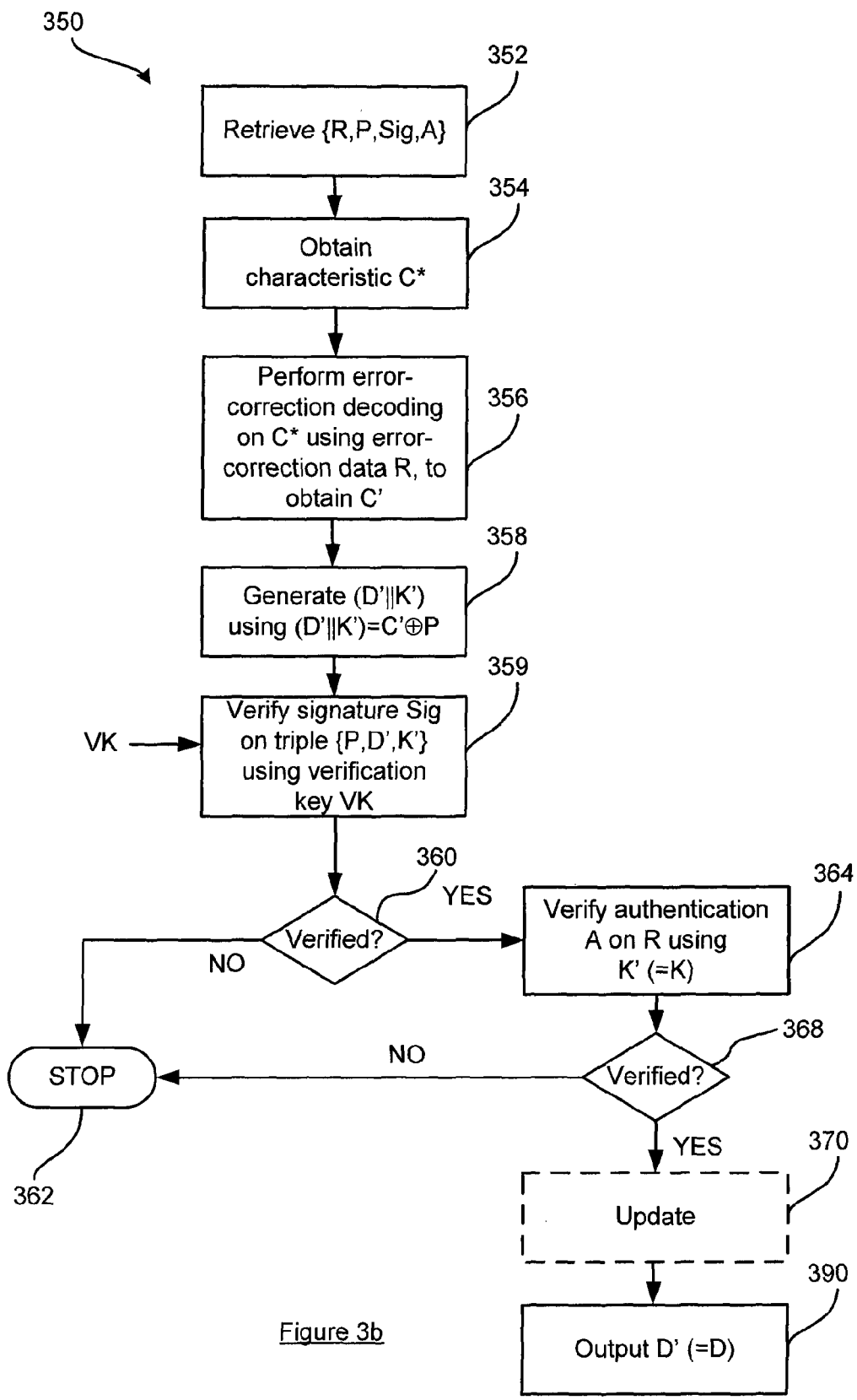

FIG. 3b is a flowchart schematically illustrating a method 350, according to embodiments of the invention, for controlling access to an amount of data D at (or stored on) a device. The device is storing a protected form of the amount of data D, where this protected form of the amount of data D was generated using the method 300 of FIG. 3a. The method 350 may be carried out, for example, to implement the step 104 of FIG. 1a.

At a step 352, the protected form of the data is retrieved (e.g. from the memory or storage of the device at which the protected form of the data is located). Thus, at the step 352, the error correction data R, the storage data P, the generated signature Sig and the authentication code A are obtained or accessed.

At a step 354, a current characteristic C* of the device is obtained (or determined or measured). This is performed in the same way in which the characteristic C of the device was obtained at the step 302 of FIG. 3a. The four possible scenarios (S-a), (S-b), (S-c) and (S-d) mentioned above apply to this current characteristic C* relative to the originally obtained characteristic C (obtained at the step 302 of FIG. 3a). Therefore, at a step 356, an error-correction decoding operation is performed on the current characteristic C* using the error correction data R to (try to) correct any errors that may exist in the current characteristic C* relative to the original characteristic C. The result of this error-correction decoding operation is a value C'. As discussed above, in scenarios (S-a) and (S-b) above, the original characteristic C is obtained from this error-correction decoding operation (i.e. C'=C); whereas in scenarios (S-c) and (S-d) above, the original characteristic C will almost certainly not be obtained from this error-correction decoding operation (i.e. C'≠C).

Thus, the steps 354 and 356 may together be viewed as determining a characteristic C' for the device (which may be equal to the original characteristic C in some circumstances and which may be different from the original characteristic C in other circumstances).

At a step 358, an amount of data D' and an authentication key K' are obtained or generated from the characteristic C' and the storage data P. In particular the pair {D',K'}=G(P, C')—i.e. the step 358 obtains the amount of data D' and the authentication key K' from the characteristic C' and the storage data P using the inverse of the method (or function F) by which the storage data P was generated from the amount of data D and the original authentication key K and the characteristic C at the step 306. In FIG. 3b, the step 358 is shown as determining the amount of data D' and the authentication key K' as a concatenation D'||K' (by XORing the storage data P with the characteristic C')—this is illustrated in this way to match the example shown in FIG. 3a, but it will be appreciated that, as other functions F could be used at the step 306 of FIG. 3a, the actual derivation of the amount of data D' and the authentication key K' at the step 358 may take other forms.

In scenarios (S-a) and (S-b) above, C'=C, in which case D'=D and K'=K, i.e. the step 358 generates the original amount of data D and the original authentication key K; whereas in scenarios (S-c) and (S-d) above, C'≠C, in which case D'≠D and K'≠K, i.e. the step 358 generates an amount of data D' different from the original amount of data D.

At a step 359, the signature Sig is verified against (or for or in relation to) a quantity of data comprising (or that is a function of) the storage data P, the amount of data D' and the authentication key K' is generated. This quantity of data is formed in the same way in which the quantity of data that was signed at the step 308 of FIG. 3a to generate the signature Sig was formed—for example, the quantity of data may be just the triple {P,D',K'}. The verification of the signature Sig uses a verification algorithm corresponding to the signature generation algorithm, and makes use of the verification key VK corresponding to the signature key SK that was used to generate the signature Sig. Such verification algorithms are well-known and shall not be described in detail herein.

As mentioned, in scenarios (S-a) and (S-b) above, D'=D and K'=K, so that the verification at the step 359 should be successful, i.e. the signature Sig corresponds to the quantity of data quantity of data comprising (or that is a function of) the storage data P, the amount of data D' and the authentication key K'; whereas in scenarios (S-c) and (S-d) above, D'≠D and K'≠K, so that the verification at the step 359 should fail, i.e. the signature Sig does not correspond to the quantity of data quantity of data comprising (or that is a function of) the storage data P, the amount of data D' and the authentication key K'.

If, at a step 360, it is determined that the verification at the step 359 has failed (i.e. the signature Sig does not correspond to the quantity of data quantity of data comprising (or that is a function of) the storage data P, the amount of data D' and the authentication key K'), then processing terminates at a step 362. If, on the other hand, it is determined at the step 360 that the verification at the step 359 has succeeded (i.e. the signature Sig corresponds to the quantity of data quantity of data comprising (or that is a function of) the storage data P, the amount of data D' and the authentication key K'), then processing continues at a step 364.

At the step 364, the authentication code A is verified against (or for or in relation to) the error correction data R. The verification of the authentication code A uses a verification algorithm corresponding to the signature/authentication generation algorithm used at the step 310 of FIG. 3a, and makes use of the authentication key K' (which, given the verification that was performed at the step 359 was successful, should be equal to the original key K). Such verification algorithms are well-known and shall not be described in detail herein.

If, at a step 368, it is determined that the verification at the step 364 has failed (i.e. the authentication code A does not correspond to the error correction data R), then processing terminates at the step 362. If, on the other hand, it is determined at the step 368 that the verification at the step 364 has succeeded (i.e. the authentication code A corresponds to the error correction data R), then processing continues at a step 370.

At the step 370, an update process may be carried out. The update process may be carried out each time the method 350 is conducted with the verification of the authentication code A and the signature Sig being successful. Alternatively, to help save on the amount of processing performed (e.g. by reducing the number of times the actual update process is carried out), the step 370 may comprise determining whether or not to carry out the update process and, only if it is determined that the update process should be performed is the actual update process performed. The update process 370 may, therefore, be viewed as an optional step of the method 350. Examples of the update process shall be described shortly with reference to FIGS. 3c and 3d.

Finally, at a step 390, the generated amount of data D' is output or provided. The step 390 should only be reached if the verifications at the steps 359 and 364 are successful, in which case the generated amount of data D' will be equal to the original amount of data D.

The steps 359 and 364 (in conjunction with the decisions at the steps 360 ad 368) may, therefore, together be viewed as providing access to the amount of data D if both (a) the signature Sig corresponds to the quantity of data and (b) the authentication code A corresponds to the error correction data R; and denying access to the amount of data D if (c) the signature Sig does not correspond to the quantity of data or (d) the authentication code A does not correspond to the error correction data R.

It will be appreciated that the step 359 (and the associated decision 360) and the step 364 (and the associated decision 368) could be performed the other way round, with the step 364 (and the associated decision 368) being performed before the step 359 (and the associated decision 360). Similarly, the steps 359 and 364 could be performed together, followed by a decision based on the outcome of those steps.

In some embodiments, the step 362 may output the (erroneous) amount of data D' instead of simply stopping the method 350—in this way, an attacker may not be able to detect that the recovery of the amount of data D has failed. A process that subsequently tries to use the amount of data D' is likely to produce erroneous results (e.g. failure to decrypt encrypted content), so that security is not breached, but an attacker may not be able to determine that the erroneous results are due to using the amount of data D' instead of the correct amount of data D.

Figure 3C:
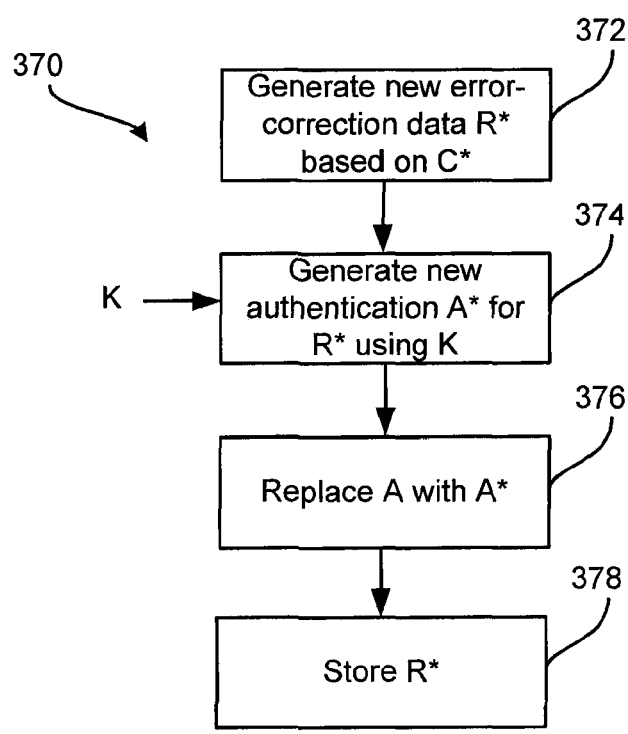
FIG. 3c schematically illustrates an update process that may be carried out, according to an embodiment of the invention.

FIG. 3c schematically illustrates the update process that may be carried out at the step 370 according to an embodiment of the invention.

At a step 372, new error correction data R* for the current characteristic C* is generated. The new error correction data R* for the new characteristic C* is generated in the same way as the original error correction data R was generated for the original characteristic C at the step 304 of FIG. 3a.

At a step 374, a new authentication code A* for the new error correction data R* is generated using the authentication key K' (which equals the original authentication key K). The new authentication code A* for the new error correction data R* is generated in the same way as the original authentication code A was generated for the original error correction data R at the step 310 of FIG. 3a.

At a step 376, the new authentication code A* is stored by the device in place of the currently stored authentication code A.

At a step 378, the new error correction data R* is stored by the device in addition to the currently stored error correction data R.

Thus, in general, after N performances of the update process, there will be (N+1) amounts of error correction data $R_0, R_1, \ldots, R_N$ generated for a characteristic, where $R_0$ is the error correction data generated for the original characteristic C generated at the step 304 of FIG. 3a, and $R_i$ is the error correction data generated for the characteristic $C_i^*$ that was current when performing the update process for the $i^{th}$ time. The error correction data R stored by the device may, therefore, be viewed as the set of error correction data $\{R_0, R_1, \ldots, R_N\}$. Thus, the step 378 may be viewed as supplementing the existing error correction data R with the new error correction data R* (i.e. adding $R^*=R_N$ to $R=\{R_0, R_1, \ldots, R_{N-1}\}$ to form $R=\{R_0, R_1, \ldots, R_N\}$). The error-correction decoding operation performed at the step 356 may then involve the following:

Perform ECC decoding on the current characteristic C* (obtained at the step 354 for the current performance of the method 350) using $R_N$ to regenerate $C_N^*$;

Perform ECC decoding on the regenerated $C_N^*$ using $R_{N-1}$ to regenerate $C_{N-1}^*$;

Perform ECC decoding on the regenerated $C_{N-1}^*$ using $R_{N-2}$ to regenerate $C_{N-2}^*$;

. . .

Perform ECC decoding on the regenerated $C_2^*$ using $R_1$ to regenerate $C_1^*$;

Perform ECC decoding on the regenerated $C_1^*$ using $R_0$ to regenerate the original characteristic C that was obtained at the step 302 of FIG. 3a.

Thus, the original characteristic C may be obtained, even if the current characteristic C* has changed significantly relative to (or differs from) the original characteristic C, thereby enabling the step 358 to use the correct value for C to obtain the correct amount of data D and the correct authentication key K.

In FIG. 3c, the step 376 replaces the currently stored authentication code A with the new authentication code A*. However, in some embodiments, the new authentication code A* is stored in addition to the currently stored authentication code(s). Thus, in general, after N performances of the update process 370, there may be (N+1) authentication codes $A_0, A_1, \ldots, A_N$ respectively for the error correction data and the step 364 of FIG. 3b may involve checking that one or more (potentially all) of the authentication codes $A_0, A_1, \ldots, A_N$ correspond to the respective error correction data $R_0, R_1, \ldots, R_N$.

In an alternative embodiment, the new authentication code A* is an authentication code for the set $\{R_0, R_1, \ldots, R_N\}$, so that only the latest authentication code A* is stored—in this case, the step 364 of FIG. 3b may involve checking that the authentication code A corresponds to the set of error correction data set $\{R_0, R_1, \ldots, R_N\}$.

Figure 3D:
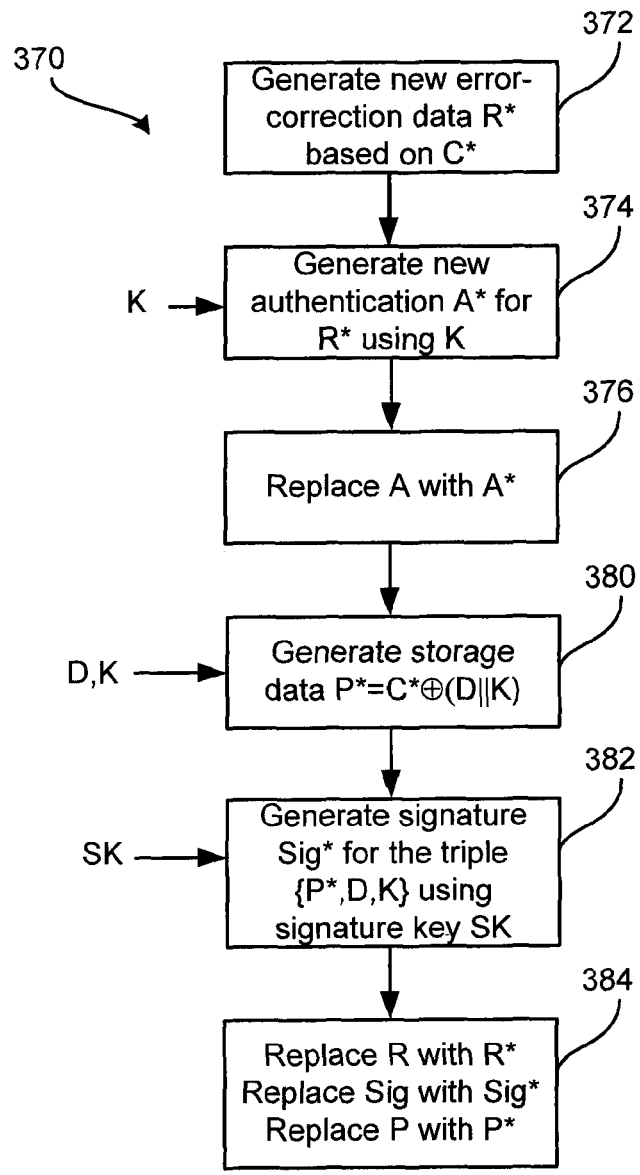
FIG. 3d schematically illustrates an update process that may be carried out, according to another embodiment of the invention.

FIG. 3d schematically illustrates the update process that may be carried out at the step 370 according to another embodiment of the invention.

At a step 372, new error correction data R* for the current characteristic C* is generated. The new error correction data R* for the new characteristic C* is generated in the same way as the original error correction data R was generated for the original characteristic C at the step 304 of FIG. 3a. This is the same as the step 372 of FIG. 3c.

At a step 374, a new authentication code A* for the new error correction data R* is generated using the authentication key K' (which equals the original authentication key K). The new authentication code A* for the new error correction data R* is generated in the same way as the original authentication code A was generated for the original error correction data R at the step 310 of FIG. 3a. This is the same as the step 374 of FIG. 3c.

At a step 376, the new authentication code A* is stored by the device in place of the currently stored authentication code A.

At a step 380, new storage data P* is generated based on the new characteristic C*, the amount of data D and the authentication key K. This may be performed in the same way as the storage data P was generated at the step 306 of FIG. 3a—i.e. P*=F({D,K},C*).

At a step 382, a new digital signature Sig* of a quantity of data comprising (or that is a function of) the new storage data P*, the amount of data D and the authentication key K is generated, for example, a digital signature Sig* of just the triple {P*,D,K}. This may be performed in the same way as the signature Sig was generated at the step 308 of FIG. 3a.

This may, of course, only be performed by embodiments in which the device stores (or retains) the signature key SK that was used at the step 308.

At a step 384, the new error correction data R* is stored by the device in place of the currently stored error correction data R; the new storage data P* is stored by the device in place of the currently stored storage data P; and the new signature Sig* is stored by the device in place of the currently stored signature Sig.

With the update processes of FIGS. 3c and 3d, the protected form of the amount of data D is updated to cater for any potential changes to the characteristic of the device. Thus, as the characteristic of the device changes over time (due to modifications of the configuration etc. of the device), the protected form of the amount of data D may also be updated, making it less likely that the device will transition from being scenario (S-b) to being in the problematic scenario (S-c). Whilst it may still be possible for the device to enter into the problematic scenario (S-c), this would only happen if more significant changes were made to the configuration of the device between successive executions of the method 350—in other words, the characteristic of the device is not allowed to drift too much without updating the protected form of the amount of data D, thereby making it less likely that the device will accidentally transition from being scenario (S-b) to being in the problematic scenario (S-c) due to a minor change in the configuration of the device.

As mentioned, the update process may be performed every time the step 370 is reached (i.e. every time access to the amount of data D is enabled and is successful). However, to avoid the overhead of the increased amount of processing that this might incur, in some embodiments of the invention, the step 370 may comprise determining whether or not to carry out the update process and, only if it is determined that the update process should be performed is the actual update process performed. The decision on whether or not to carry out the update process may be based on one or more of:

- An amount of time that has elapsed since the update process was last performed or since the amount of data D was initially stored in protected form: for example, the device may store an indication of when the error correction data R was most recently stored (be that the first time at the step 312 of FIG. 3a or at the step 378 of FIG. 3c or at the step 384 of FIG. 3d), and if the difference between the current time and the when the error correction data R was most recently stored exceeds a predetermined threshold, then it may be determined that the update process should be performed. This helps ensure that performance of the update process is not left undone for too long, thereby reducing the likelihood will have modified the configuration for the device too much to cause the device to enter the problematic scenario (S-c).
- A number of accesses to the amount of data D that have been provided since the update process was last performed or since the amount of data D was initially stored in protected form: for example, the device may store an indication of the number of times the step 390 has been performed since the most recent performance of the update process, and if that number exceeds a predetermined threshold, then it may be determined that the update process should be performed. This helps ensure that performance of the update process is not left undone for too long, thereby reducing the likelihood will have modified the configuration for the device too much to cause the device to enter the problematic scenario (S-c).
- The number of errors corrected in (or detected within) the current characteristic C* by the error correction decoding operation: for example, if the number of errors detected when performing the error-correction decoding operation at the step 356 exceeds a predetermined threshold, then it may be determined that the update process should be performed. This helps ensure the current characteristic C* for the device does not deviate too far and, in particular, does not have more errors that would be correctable by the error correction decoding operation, thereby reducing the likelihood of the device entering the problematic scenario (S-c).

5—Alternative Embodiments

Figure 3E:
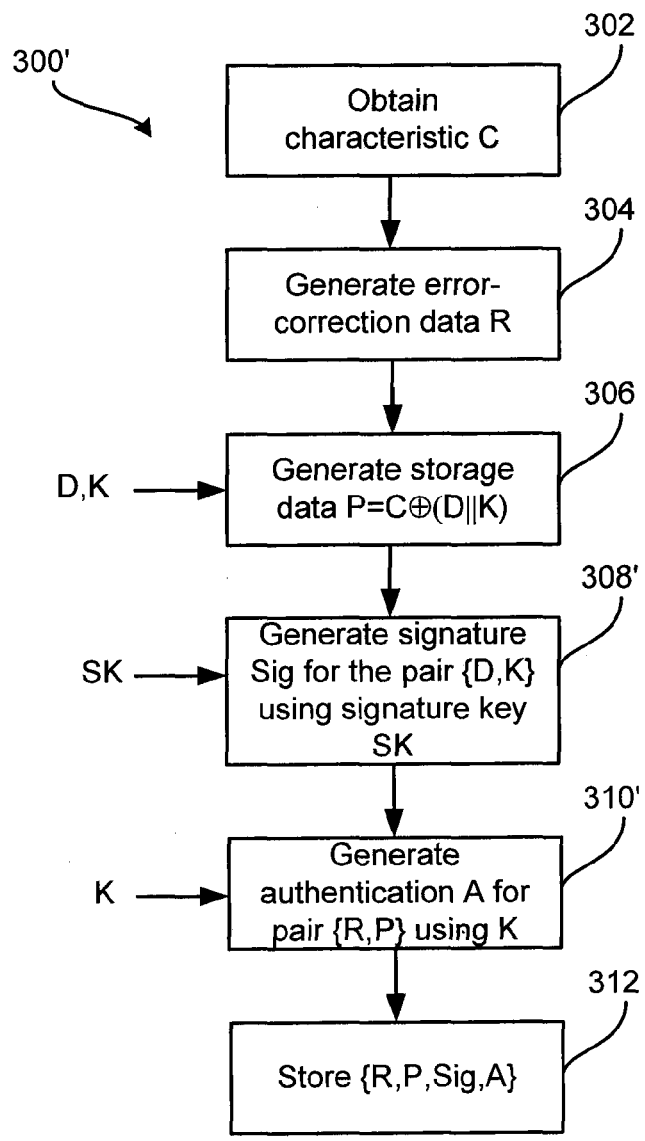
FIG. 3e is a flowchart schematically illustrating a method, according to embodiments of the invention, for storing an amount of data D on a device, in a manner that locks the amount of data D to that device.

FIG. 3e is a flowchart schematically illustrating a method 300', according to embodiments of the invention, for storing an amount of data D on a device, in a manner that locks the amount of data D to that device. The method 300' may be carried out, for example, to implement the step 102 of FIG. 1a. The method 300' may be carried out by the device itself (i.e. the device that is to store the amount of data D and to which the amount of data D is to be locked). The method 300' may, alternatively, be carried out by a different entity, such as a manufacturer of the device, with the method 300' being performed when the manufacturer initialises the device and wishes to store the amount of data D on the device in a manner that locks the amount of data D to the device (e.g. initialising the device with a personalised cryptographic key).

The method 300' is identical to the method 300, except for the following:

- The step 308 in the method 300 is replaced by a step 308' in the method 300'. At the step 308', the digital signature Sig that is generated is a digital signature of a quantity of data comprising (or that is a function of) the amount of data D and the authentication key K, for example, a digital signature Sig of just the pair {D,K} (e.g. of a concatenation D∥K). This quantity of data may be, for example, a concatenation of, interleaving of, or other combination or function (such as a hash) of the amount of data D and the authentication key K. In other words, the storage data P is not used in the step 308' to form the signature Sig, whereas the storage data P is used in the step 308.
- The step 310 in the method 300 is replaced by a step 310' in the method 300'. At the step 310, the authentication code A that is generated is an authentication code for a quantity of data comprising (or that is a function of) the error correction data R and the storage data P, for example, an authentication code for just the pair {R,P} (e.g. for a concatenation R∥P). This quantity of data may be, for example, a concatenation of, interleaving of, or other combination or function (such as a hash) of the error correction data R and the storage data P. The authentication code is generated using the authentication key K.

The same comments given above for the method 300 then apply analogously to the method 300'.

Figure 3F:
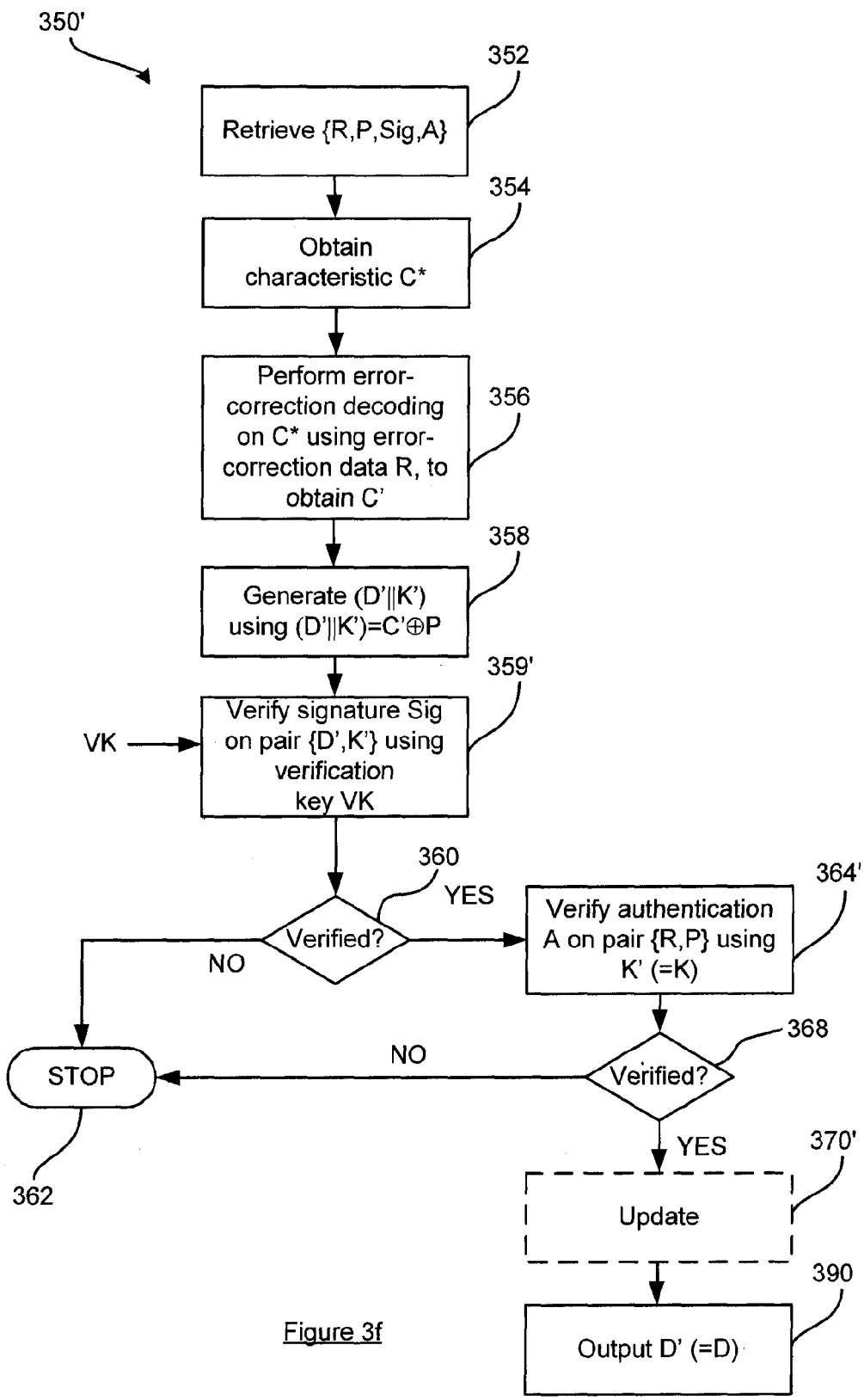
FIG. 3f is a flowchart schematically illustrating a method, according to embodiments of the invention, for controlling access to an amount of data D at (or stored on) a device, the data having been stored using the method of FIG. 3e.

FIG. 3f is a flowchart schematically illustrating a method 350', according to embodiments of the invention, for controlling access to an amount of data D at (or stored on) a device. The device is storing a protected form of the amount of data D, where this protected form of the amount of data D was generated using the method 300' of FIG. 3e. The method 350' may be carried out, for example, to implement the step 104 of FIG. 1a.

The method 350' is identical to the method 350, except for the following:

The step 359 in the method 350 is replaced by a step 359' in the method 350'. At the step 359', the signature Sig is verified against (or for or in relation to) a quantity of data comprising (or that is a function of) the amount of data D' and the authentication key K'. This quantity of data is formed in the same way in which the quantity of data that was signed at the step 308' of FIG. 3e to generate the signature Sig was formed—for example, the quantity of data may be just the pair {D',K'}. The verification of the signature Sig uses a verification algorithm corresponding to the signature generation algorithm, and makes use of the verification key VK corresponding to the signature key SK that was used to generate the signature Sig. In other words, the storage data P is not used in the step 359' to verify the signature Sig, whereas the storage data P is used in the step 359.

The step 364 in the method 350 is replaced by a step 364' in the method 350'. At the step 364' the authentication code A is verified against (or for or in relation to) a quantity of data comprising (or that is a function of) the error correction data R and the storage data P. This quantity of data is formed in the same way as at the step 310' of FIG. 3e—for example, the quantity of data may be just the pair {R,P} (e.g. of a concatenation R∥P). The verification of the authentication code A uses a verification algorithm corresponding to the signature/authentication generation algorithm used at the step 310' of FIG. 3e, and makes use of the authentication key K' (which, given the verification that was performed at the step 359' was successful, should be equal to the original key K).

The step 370 in the method 350 is replaced by a step 370' in the method 350'. An example of how the step 370' may function is illustrated below with reference to FIG. 3g. The other comments in relation to the step 370 (e.g. only performing that step in certain circumstances) apply equally to the step 370'.

The same comments given above for the method 350 then apply analogously to the method 350'.

Figure 3G:
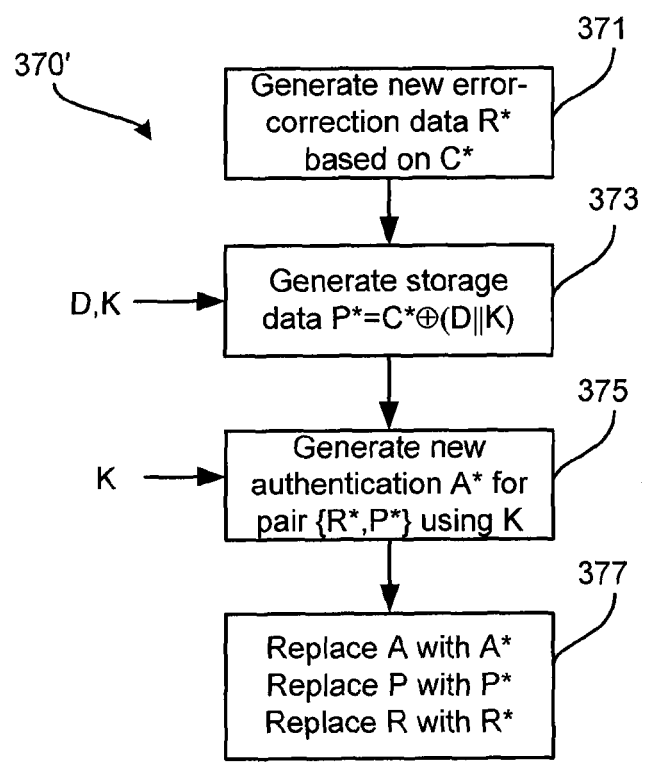
FIG. 3g schematically illustrates an update process that may be carried out, according to an embodiment of the invention.

FIG. 3g schematically illustrates the update process that may be carried out at the step 370' of the method 350' of FIG. 3f according to an embodiment of the invention.

At a step 371, new error correction data R* for the current characteristic C* is generated. The new error correction data R* for the new characteristic C* is generated in the same way as the original error correction data R was generated for the original characteristic C at the step 304 of FIG. 3d.

At a step 373, new storage data P* is generated based on the new characteristic C*, the amount of data D and the authentication key K. This may be performed in the same way as the storage data P was generated at the step 306 of FIG. 3d—i.e. P*=F({D,K},C*).

At a step 375, a new authentication code A* for a quantity of data comprising (or that is a function of) the new error correction data R* and the new storage data P* is generated. This quantity of data is formed in the same way as at the step 310' of FIG. 3e—for example, the quantity of data may be just the pair {R*,P*} (e.g. a concatenation R*∥P*). The new authentication code A* is generated in the same way as the original authentication code A was generated at the step 310' of FIG. 3e.

At a step 377, the new error correction data R* is stored by the device in place of the currently stored error correction data R; the new storage data P* is stored by the device in place of the currently stored storage data P; and the new authentication code A* is stored by the device in place of the currently stored authentication code A.

The use of the embodiments shown in FIGS. 3e, 3f and 3g means that the update process does not need to make use of the signature key SK. This is particularly useful for embodiments in which the signature key SK is not available to (e.g. not stored by) the device.

6—Modifications

It will be appreciated that the methods described have been shown as individual steps carried out in a specific order. However, the skilled person will appreciate that these steps may be combined or carried out in a different order whilst still achieving the desired result.

It will be appreciated that embodiments of the invention may be implemented using a variety of different information processing systems. In particular, although the figures and the discussion thereof provide an exemplary computing system and methods, these are presented merely to provide a useful reference in discussing various aspects of the invention. Embodiments of the invention may be carried out on any suitable data processing device, such as a personal computer, laptop, personal digital assistant, mobile telephone, set top box, television, server computer, etc. Of course, the description of the systems and methods has been simplified for purposes of discussion, and they are just one of many different types of system and method that may be used for embodiments of the invention. It will be appreciated that the boundaries between logic blocks are merely illustrative and that alternative embodiments may merge logic blocks or elements, or may impose an alternate decomposition of functionality upon various logic blocks or elements.

It will be appreciated that the above-mentioned functionality may be implemented as one or more corresponding modules as hardware and/or software. For example, the above-mentioned functionality may be implemented as one or more software components for execution by a processor of the system. Alternatively, the above-mentioned functionality may be implemented as hardware, such as on one or more field-programmable-gate-arrays (FPGAs), and/or one or more application-specific-integrated-circuits (ASICs), and/or one or more digital-signal-processors (DSPs), and/or other hardware arrangements. Method steps implemented in flowcharts contained herein, or as described above, may each be implemented by corresponding respective modules; multiple method steps implemented in flowcharts contained herein, or as described above, may together be implemented by a single module.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program" as used herein, may be a sequence of instructions designed for execution on a computer system, and may include a subroutine, a function, a procedure, a module, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

The invention claimed is:

1. A method of storing an amount of data D in association with a device, the method comprising:
   obtaining a characteristic C of the device;
   generating, by one or more processors, error correction data R for the characteristic C, the error correction data R enabling correction of up to a predetermined number of errors in a version of the characteristic C;
   combining, by one or more processors, the characteristic C with the amount of data D and an authentication key K to generate storage data P, wherein said combining is arranged so that the amount of data D and the authentication key K are obtainable using the characteristic C and the storage data P;
   generating, by one or more processors, a signature using a signature key, the signature being a digital signature of a quantity of data comprising the storage data P, the amount of data D and the authentication key K, wherein the signature key corresponds to a verification key accessible by the device;
   generating, by one or more processors, an authentication code for the error correction data R using the authentication key K, wherein the authenticity of the error correction data R is verifiable using the authentication code and the authentication key K; and
   storing, at the device, the error correction data R, the storage data P, the signature and the authentication code to thereby store the amount of data D.

2. The method of claim 1, wherein the amount of data D is not obtainable from the storage data P without the characteristic C.

3. The method of claim 1, wherein the storage data P comprises an XOR of the characteristic C with a combination of the amount of data D and the authentication key K.

4. The method of claim 3, wherein the combination of the amount of data D and the authentication key K comprises a concatenation of the amount of data D and the authentication key K.

5. The method of claim 1, wherein the signature is generated using an asymmetric digital signature algorithm.

6. The method of claim 1, wherein the authentication code is a message authentication code.

7. A method of controlling access to an amount of data D at a device, the device storing information comprising: error correction data R, storage data P, a signature and an authentication code, the information generated using a method according to claim 1, the method comprising:
   determining, by one or more processors, a characteristic C of the device, wherein determining the characteristic C of the device comprises obtaining a current characteristic C* of the device and performing an error correction decoding operation on the current characteristic C* using the error correction data R;
   obtaining, by one or more processors, the amount of data D and an authentication key K using the determined characteristic C and the storage data P;
   determining, by one or more processors, using a verification key, whether the signature corresponds to a quantity of data comprising: the storage data P, the amount of data D and the authentication key K;
   determining, by one or more processors, using the authentication key K, whether the authentication code corresponds to the error correction data R;
   providing access, by one or more processors, to the amount of data D if both (a) the signature corresponds to the quantity of data and (b) the authentication code corresponds to the error correction data R; and
   denying access, by one or more processors, to the amount of data D if (a) the signature does not correspond to the quantity of data or (b) the authentication code does not correspond to the error correction data R.

8. The method of claim 7, wherein the amount of data D and the authentication key K are obtained together from an XOR of the storage data P and the determined characteristic C.

9. The method of claim 7, comprising:
   if access to the amount of data D is provided, either:
      (a) performing an update for the stored information based on the current characteristic C*; or
      (b) determining whether to perform an update for the stored information and if it determined that an update for the stored information is to be performed, then performing an update for the stored information based on the current characteristic C*.

10. The method of claim 9, wherein determining whether to perform an update for the stored information is based on one or more of:
   an amount of time elapsed since the information was last updated or initially stored;
   a number of accesses to the amount of data D that have been provided since the information was last updated or initially stored;
   a number of errors in the current characteristic C*.

11. The method of claim 9, wherein performing the update for the stored information comprises:
   generating new error correction data R* for the current characteristic C*, the new error correction data R* enabling correction of up to a predetermined number of errors in a version of the current characteristic C*;
   generating a new authentication code for the new error correction data R* using the authentication key K, wherein the authenticity of the new error correction data R* is verifiable using the new authentication code and the authentication key K;
   supplementing the error correction data R with the new error correction data R*; and
   storing the new authentication code.

12. The method of claim 9, wherein performing the update for the stored information comprises:
   generating new error correction data R* for the current characteristic C*, the new error correction data R* enabling correction of up to a predetermined number of errors in a version of the current characteristic C*;
   generating a new authentication code for the new error correction data R* using the authentication key K, wherein the authenticity of the new error correction data R* is verifiable using the new authentication code and the authentication key K;
   combining the current characteristic C* with the amount of data D and the authentication key K to generate new storage data P*, wherein said combining is arranged so that the amount of data D and the authentication key K are obtainable using the current characteristic C* and the new storage data P*;

generating a signature using the signature key, the signature being a digital signature of a quantity of data comprising the new storage data P*, the amount of data D and the authentication key K;

storing the new error correction data R* in place of the stored error correction data R;

storing the new storage data P* in place of the stored storage data P;

storing the new signature Sig* in place of the stored signature Sig; and storing the new authentication code in place of the stored authentication code.

13. The method of claim 7, wherein the amount of data D comprises a cryptographic key.

14. The method of claim 1, wherein the amount of data D comprises a cryptographic key.

15. A method of storing an amount of data D in association with a device, the method comprising:

obtaining a characteristic C of the device;

generating, by one or more processors, error correction data R for the characteristic C, the error correction data R enabling correction of up to a predetermined number of errors in a version of the characteristic C;

combining, by one or more processors, the characteristic C with the amount of data D and an authentication key K to generate storage data P, wherein said combining is arranged so that the amount of data D and the authentication key K are obtainable using the characteristic C and the storage data P;

generating, by one or more processors, a signature using a signature key, the signature being a digital signature of a quantity of data comprising the amount of data D and the authentication key K, wherein the signature key corresponds to a verification key accessible by the device;

generating, by one or more processors, an authentication code for a quantity of data comprising the error correction data R and the storage data P, the authentication code generated using the authentication key K, wherein the authenticity of the error correction data R and the storage data P is verifiable using the authentication code and the authentication key K; and storing, at the device, the error correction data R, the storage data P, the signature and the authentication code to thereby store the amount of data D.

16. The method of claim 15, wherein the amount of data D is not obtainable from the storage data P without the characteristic C.

17. The method of claim 15, wherein the storage data P comprises an XOR of the characteristic C with a combination of the amount of data D and the authentication key K.

18. The method of claim 17, wherein the combination of the amount of data D and the authentication key K comprises a concatenation of the amount of data D and the authentication key K.

19. The method of claim 15, wherein the signature is generated using an asymmetric digital signature algorithm.

20. The method of claim 15, wherein the authentication code is a message authentication code.

21. A method of controlling access to an amount of data D at a device, the device storing information comprising: error correction data R, storage data P, a signature and an authentication code, the information generated using a method according to claim 15, the method comprising:

determining, by one or more processors, a characteristic C of the device, wherein determining the characteristic C of the device comprises obtaining a current characteristic C* of the device and performing an error correction decoding operation on the current characteristic C* using the error correction data R;

obtaining, by one or more processors, the amount of data D and an authentication key K using the determined characteristic C and the storage data P;

determining, by one or more processors, using a verification key, whether the signature corresponds to a first quantity of data comprising the amount of data D and the authentication key K;

determining, by one or more processors, using the authentication key K, whether the authentication code corresponds to a second quantity of data comprising the error correction data R and the storage data P;

providing access, by one or more processors, to the amount of data D if both (a) the signature corresponds to the first quantity of data and (b) the authentication code corresponds to the second quantity of data; and denying access, by one or more processors, to the amount of data D if (a) the signature does not correspond to the first quantity of data or (b) the authentication code does not correspond to the second quantity of data.

22. The method of claim 21, wherein the amount of data D and the authentication key K are obtained together from an XOR of the storage data P and the determined characteristic C.

23. The method of claim 21, comprising:

if access to the amount of data D is provided, either performing an update for the stored information based on the current characteristic C*; or (a) determining whether to perform an update for the stored information and (b) if it determined that an update for the stored information is to be performed, then performing an update for the stored information based on the current characteristic C*.

24. The method of claim 23, wherein determining whether to perform an update for the stored information is based on one or more of:

an amount of time elapsed since the information was last updated or initially stored;

a number of accesses to the amount of data D that have been provided since the information was last updated or initially stored;

a number of errors in the current characteristic C*.

25. The method of claim 23, wherein performing the update for the stored information comprises:

generating new error correction data R* for the current characteristic C*, the new error correction data R* enabling correction of up to a predetermined number of errors in a version of the current characteristic C*;

combining the current characteristic C* with the amount of data D and the authentication key K to generate new storage data P*, wherein said combining is arranged so that the amount of data D and the authentication key K are obtainable using the current characteristic C* and the new storage data P*;

generating a new authentication code for a quantity of data comprising the new error correction data R* and the new storage data P*, the new authentication code generated using the authentication key K, wherein the authenticity of the new error correction data R* and the new storage data P* is verifiable using the new authentication code and the authentication key K;

storing the new error correction data R* in place of the stored error correction data R;

storing the new storage data P* in place of the stored storage data P; and storing the new authentication code in place of the stored authentication code.

26. The method of claim 21, wherein the amount of data D comprises a cryptographic key.

27. The method of claim 15, wherein the amount of data D comprises a cryptographic key.

28. An apparatus arranged to store an amount of data D in association with a device, the apparatus comprising:

at least one memory; and one or more processors, the at least one memory operatively coupled to the one or more processors and storing instructions that, when executed by the one or more processors, cause the one or more processors to:

obtain a characteristic C of the device;

generate error correction data R for the characteristic C, the error correction data R enabling correction of up to a predetermined number of errors in a version of the characteristic C;

combine the characteristic C with the amount of data D and an authentication key K to generate storage data P, wherein said combining is arranged so that the amount of data D and the authentication key K are obtainable using the characteristic C and the storage data P;

generate a signature using a signature key, the signature being a digital signature of a quantity of data comprising the storage data P, the amount of data D and the authentication key K, wherein the signature key corresponds to a verification key accessible by the device;

generate an authentication code for the error correction data R using the authentication key K, wherein the authenticity of the error correction data R is verifiable using the authentication code and the authentication key K; and store the error correction data R, the storage data P, the signature and the authentication code to thereby store the amount of data D.

29. The apparatus of claim 28, wherein the apparatus is the device.

30. A device comprising:

a memory storing information comprising: error correction data R, storage data P, a signature and an authentication code, the information generated using an apparatus according to claim 28; and one or more processors arranged to control access to an amount of data D at the device by:

determining a characteristic C of the device, wherein determining the characteristic C of the device comprises obtaining a current characteristic C* of the device and performing an error correction decoding operation on the current characteristic C* using the error correction data R;

obtaining the amount of data D and an authentication key K using the determined characteristic C and the storage data P;

determining, using a verification key, whether the signature corresponds to a quantity of data comprising: the storage data P, the amount of data D and the authentication key K;

determining, using the authentication key K, whether the authentication code corresponds to the error correction data R;

providing access to the amount of data D if both (a) the signature corresponds to the quantity of data and (b) the authentication code corresponds to the error correction data R; and denying access to the amount of data D if (a) the signature does not correspond to the quantity of data or (b) the authentication code does not correspond to the error correction data R.

31. An apparatus arranged to store an amount of data D in association with a device, the apparatus comprising:

at least one memory; and one or more processors, the at least one memory operatively coupled to the one or more processors and storing instructions that, when executed by the one or more processors, cause the one or more processors to:

obtain a characteristic C of the device;

generate error correction data R for the characteristic C, the error correction data R enabling correction of up to a predetermined number of errors in a version of the characteristic C;

combine the characteristic C with the amount of data D and an authentication key K to generate storage data P, wherein said combining is arranged so that the amount of data D and the authentication key K are obtainable using the characteristic C and the storage data P;

generate a signature using a signature key, the signature being a digital signature of a quantity of data comprising the amount of data D and the authentication key K, wherein the signature key corresponds to a verification key accessible by the device;

generate an authentication code for a quantity of data comprising the error correction data R and the storage data P, the authentication code generated using the authentication key K, wherein the authenticity of the error correction data R and the storage data P is verifiable using the authentication code and the authentication key K; and store the error correction data R, the storage data P, the signature and the authentication code to thereby store the amount of data D.

32. The apparatus of claim 31, wherein the apparatus is the device.

33. A device comprising:

a memory storing information comprising: error correction data R, storage data P, a signature and an authentication code, the information generated using an apparatus according to claim 31; and one or more processors arranged to control access to an amount of data D at the device by:

determining a characteristic C of the device, wherein determining the characteristic C of the device comprises obtaining a current characteristic C* of the device and performing an error correction decoding operation on the current characteristic C* using the error correction data R;

obtaining the amount of data D and an authentication key K using the determined characteristic C and the storage data P;

determining, using a verification key, whether the signature corresponds to a first quantity of data comprising the amount of data D and the authentication key K;

determining, using the authentication key K, whether the authentication code corresponds to a second quantity of data comprising the error correction data R and the storage data P;

providing access to the amount of data D if both (a) the signature corresponds to the first quantity of data and (b) the authentication code corresponds to the second quantity of data; and denying access to the amount of data D if (a) the signature does not correspond to the first quantity of data or (b) the authentication code does not correspond to the second quantity of data.

\* \* \* \* \*